Patented May 22, 1951

2,554,222

UNITED STATES PATENT OFFICE 2,554,222

LUBRICANTS

Fred H. Stross, Berkeley, Calif., assignor to Shell Development Company, San Francisco, Calif., a corporation of Delaware No Drawing. Application October 28, 1947, Serial No. 782,694

13 Claims. (Cl. 252—28)

This invention pertains to the art of thickening liquids and more particularly it relates to a novel lubricant having improved stability against the deleterious action of water.

Oils have heretofore been thickened or rendered more viscous by admixture with other materials such as soap, graphite, talc, and diatomaceous earth. More recently thickening agents imparting improved thermal stability to the composition have been employed. These comprise inorganic gels of such materials as silica, magnesia, alumina, etc. It has been found that these latter materials not only may be used to produce thickened oils but also for the manufacture of greases in the presence or absence of any other grease-forming agent. Furthermore, such thickened oils or greases are useful where excessive temperatures are encountered and where ordinary greases, comprising lubricating oil and a soap, tend to disintegrate or decompose.

While lubricants containing these inorganic gels have improved thermal stability, one chief drawback has limited their utilization: inorganic gels of this character are sensitive to the action of water, and consequently lubricants containing them do not ordinarily function satisfactorily in the presence of water, since the gelling agent, when attacked thereby, tends to settle from the composition and thus destroy the desired structure of the thickened lubricant or grease.

It is an object of this invention to provide a means for stabilizing lubricants containing inorganic gels. It is another object of this invention to provide improved lubricants or greases having both high thermal stability and improved water-resistance. It is a further object of this invention to provide a thickened or gelled lubricant having improved viscosity index together with superior resistance to the action of water. Other objects will become apparent during the following discussion.

Now, in accordance with this invention, it has been found that lubricants comprising oleaginous materials thickened or gelled by the presence of inorganic gels such as silica gel may be materially improved by the presence therein of a minor amount (preferably 1–25% of the gel) of a hydrophobic cationic surface-active agent, as more fully described hereinafter. Still in accordance with this invention, it has been discovered that lubricants containing the above ingredients have superior resistance to the action of water and, at the same time, exhibit superior thermal stability and viscosity-temperature relationships. Again in accordance with this invention, it has been found that a highly preferred method of incorporating the surface-active agent in the composition comprises dissolving the latter in a solvent therefor, adding the inorganic gel, evaporating the solvent so as to leave a thin coating of the agent on the surface of the gel particles and subsequently incorporating the modified gel with the oleaginous material it is to thicken.

Hydrophobic cationic surface-active agents which may be used to improve the gelled compositions of the present invention include, among other types, the higher aliphatic amines, quaternary ammonium compounds, polyamines, cyclic, nuclear or extranuclear amines, and their salts, amides, and other derivatives, such as those containing chloro, hydroxy, ether, ester, sulpho or nitro groups, as well as the analogous sulfur, phosphorus, arsenic or antimony compounds.

Suitable aliphatic amines are those having at least twelve carbon atoms, such as dodecyl amines, heptadecyl amines, lauryl amine and other primary, secondary or tertiary aliphatic amines, preferably those in which more than eleven carbon atoms are in a straight chain.

Quaternary ammonium compounds which may be employed are dimethylhydroxyethyldodecylammonium hydroxide, dimethylbenzyllaurylammonium chloride, dimethylbenzyloctadecylammonium chloride; the oleic acid ester of benzylhydroxyethylmorpholinium chloride, etc.

Other special products of particular interest include the amines obtained by the chlorination and subsequent ammonolysis of paraffin wax; the fatty acids salts of polyamines derived from the interaction of acrolein and ammonia; the adducts of hydrogen sulfide and diallylamine, etc. The latter class is fully described in a copending application Serial No. 768,266, filed August 12, 1947, by Denham Harman and Harry J. Sommer. This case has now matured into Patent No. 2,517,564 granted August 8, 1947.

Cyclic amines which may be employed include the alkylated imidazolines, such as heptadecylimidazoline, alkylated pyrimidines, substituted acridines, benzidine and diphenylamine.

Polyamines which are useful include especially partially saponified polyalkylene polyamines, such as oleylamidoethylamine oleate as well as the polyethylene polyamines or amidoamines, including aminoethyl stearamide.

The gels which may be used in the compositions of the present invention are preferably those known as aerogels of inorganic substances including silica, magnesia, alumina and other gel-forming metal oxides and hydroxides, sulfides, etc. A typical method for the preparation of such aerogels comprises precipitating silica by the addition of sulfuric acid to sodium silicate solution and washing the gel relatively free of salts with water. This composition is now used in industry as an intermediate in the making of silica gel. If the water is evaporated from the gel in this state the latter shrinks considerably in volume, apparently due to the force exerted on the solid phase of the gel by the surface tension of the liquid as it recedes in the pores of the material. These materials are referred to as xerogels. As distinguished from the xerogels, the aerogels are composed of the original solid phase of the gel in substantially the same condition as while filled with the swelling liquid. Aerogels are conveniently made by raising the gel to the critical temperature of the liquid contained therein while maintaining the pressure on the system sufficiently high to insure that the liquid phase will remain liquid until the critical temperature is reached. At this point the liquid will be converted into the gaseous state without the formation of menisci at a gas-liquid interface. The degree of porosity may be controlled to a large degree by controlling the concentration of silica in the gel as it is precipitated. These aerogels may be used in this condition for the preparation of the present compositions or may be ground to a finer state of subdivision such as in a stone ball mill.

It has been found desirable to use finely ground aerogel in preparing thickened lubricating oils since a smoother, more uniform suspension is obtained. However, a larger amount of ground gel is required to obtain a given degree of thickening in an oil than when unground gel is employed.

The oleaginous materials which may be used in preparing the compositions of the present invention are preferably those having lubricating properties and especially include petroleum lubricants or fractions thereof such as kerosene, gas oil, lubricating oil and other fractions. Other oleaginous materials which may be used are vegetable oils such as turpentine, corn oil, cottonseed oil and castor oil; animal oils such as neat's-foot oil; and fish oils such as sperm oil.

Oleaginous materials when modified by such means as halogenation, hydrogenation, alkylation and similar means are also useful. Depending upon the application intended, oleaginous materials of extremely low or extremely high viscosity may be used successfully. Lubricating oils having a viscosity of about 30 seconds at 100° F. to about 250 seconds at 210° F. and higher may be used if desired. Furthermore, paraffinic, naphthenic or asphaltic base oils or combinations and mixtures thereof may be used and may be selected to provide gels of desired properties.

A special group of oleaginous materials which may be used in the products of the present invention include the group commonly referred to as synthetic lubricants. These may include the older types such as polymerized olefins, or the newer and more versatile types, such as the polyalkylene oxides, polyalkylene glycols and various high molecule weight esters. Preferred lubricants in this class include polypropylene oxide, copolymers of trimethylene glycol and ethylene glycol, di-(2-ethylhexyl) sebacate, di-(2-ethylhexyl) adipate, di-(heptadecyl) sebacate as well as their analogs and homologs, such as the azelates and glutarates. Preferably these oleaginous substances are substantially immiscible with water and are the principal lubricating components in the compositions of this invention. They may be used singly or in admixture with each other or with other lubricants.

Incorporation of a larger amount of aerogel than is required to merely thicken the oil results in formation of a grease having high thermal stability and, in the presence of the subject cationic surface-active agent, having a substantially improved resistance to the action of water. A grease of satisfactory properties may be formed by incorporating approximately 10% of an aerogel in a low viscosity mineral oil with vigorous mechanical stirring and subsequently running the mixture through a roller mill such as is used to grind paints. The shearing action of the rollers serves to grind the oil into the pores of the aerogel and thus create a grease-like composition.

Another means of preparing these lubricants comprises forming the gel in the presence of a solution of a surface-active material and subsequently displacing the liquid medium surrounding the gel with the oleaginous material to form what may be called a petrogel, if the oil is from a petroleum source.

Alternatively, a petrogel may be formed by immersing the inorganic gel contained in a solution of the surface-active agent in a desired oil and distilling off the solvent in which the gel was originally suspended. Other means may be employed, such as incorporating the surface-active material in the oil and subsequently adding the gel, such as in a ball mill or colloid mill.

It will be understood that the lubricants and greases of the present invention may include additional compounding agents used in this art such as graphite, fats and materials for improving the oilness characteristics, such as chlorinated hydrocarbons of high boiling point; materials which improve the viscosity index characteristics such as polymerized olefins of high molecular weight; corrosion inhibitors; oxidation inhibitors, etc.

The following example is included to illustrate the process of the present invention:

*Example I*

Ten parts of a high viscosity index petroleum lubricant was added to a mixture of 1 part ground silica aerogel and 0.1 part N-cetyl piperidine at a temperature of 160° C. The mixture was vigorously stirred until a grease resulted. A second composition was prepared from the same oil and aerogel, the piperidine being omitted. Water was added to the two greases. Within a few seconds the second grease commenced to disintegrate while the improved grease containing the piperidine showed no change in appearance or consistency after standing in the presence of water for 4 days.

*Example II*

A polymeric adduct of diallyl amine and hydrogen sulfide having a molecular weight of about 400 was prepared by heating the reactants under pressure for 20 hours at 120° C. One part of the adduct was dispersed in 10 parts of a silica gelled petroleum lubricant as described in Example I. Water was added and the grease was allowed to stand for one week. No change in the gelled structure was apparent at that time.

*Example III*

A polymeric adduct of acrolein and ammonia, prepared by mixing the reactants at −60° C., was hydrogenated in the presence of Raney nickel to give a product having a molecular weight of 228. The polymer was heated with oleic acid to give a mixture of amine salts and amides. The mixture was used to stabilize a silica gel grease as described in Example I. The grease so formed resisted water action for periods longer than 1 week.

I claim as my invention:

1. A non-aqueous gelled composition comprising a major amount of a liquid petroleum lubricant, a silica aerogel, the latter being present in an amount at least sufficient to impart a gelled structure to the composition and 1–25% by weight of said aerogel of N-cetyl piperidine.

2. A non-aqueous gelled composition comprising a major amount of a liquid petroleum lubricant, a silica aerogel, the latter being present in an amount at least sufficient to impart a gelled structure to the composition and 1–25% by weight of said aerogel of a polymeric adduct of diallyl amine and hydrogen sulfide.

3. A non-aqueous gelled composition comprising liquid oleaginous material, a hydrophilic inorganic gel in an amount to substantially thicken said material and to convert it into a gel, and from about 1% to about 25% by weight of a hydrophobic cationic surface-active agent based on the inorganic gel, said composition being characterized by the fact that the structure of the inorganic gel therein is substantially that of the gel as originally formed.

4. A non-aqueous gelled composition comprising a petroleum lubricating oil, a hydrophilic inorganic gel in an amount to substantially thicken said oil and convert it to a gel, and 1–25% by weight of said gel of a hydrophobic cationic surface-active agent, said composition being characterized by the fact that the structure of the inorganic gel therein is substantially that of the gel as originally formed.

5. A non-aqueous gelled composition comprising a liquid oleaginous material, a silica gel in an amount to substantially thicken said material and to convert it to a gel, and 1–25% by weight of said gel of a hydrophobic cationic surface-active agent, said silica gel retaining in the gelled composition the gel structure substantially as originally formed.

6. A non-aqueous gelled composition comprising a liquid oleaginous material, a hydrophilic inorganic gel in an amount to substantially thicken said material and to convert it to a gel, and 1–25% by weight of said gel of a hydrophobic amine, said composition being characterized by the fact that the structure of the inorganic gel therein is substantially that of the gel as originally formed.

7. A non-aqueous gelled composition comprising liquid oleaginous material, a hydrophilic inorganic gel in an amount to substantially thicken said oleaginous material and to convert it into a gel and 1–25% by weight of said gel of a hydrophobic cationic surface-active agent, said composition being characterized by the fact that the structure of the inorganic gel therein is substantially that of the gel as originally formed.

8. A non-aqueous gelled composition comprising a liquid oleaginous material, a hydrophilic inorganic aerogel, and 1–25% by weight of said gel of a hydrophobic cationic surface-active agent.

9. A lubricant comprising a liquid oleaginous material, a hydrophilic inorganic gel in at least sufficient quantities to thicken said oleaginous material, and 1–25% by weight of said gel of a hydrophobic cationic surface-active agent, said composition being characterized by the fact that the structure of the inorganic gel therein is substantially that of the gel as originally formed.

10. The process for the preparation of a non-aqueous gelled composition comprising commingling a hydrophilic inorganic gel characterized by having a structure which is substantially that as originally formed with a minor amount of hydrophobic cationic surface-active agent in the presence of a relatively volatile solvent for said agent, removing said solvent and dispersing said gel and agent in an oleaginous material in sufficient amount to substantially thicken said oleaginous material and to impart a gelled structure to the resulting composition the amount of said agent being between 1% and 25% by weight of said gel.

11. A lubricating composition comprising a liquid oleaginous material, an inorganic gel in at least sufficient quantity to thicken said oleaginous material, and 1 to 25% by weight of said gel of a hydrophobic organic quaternary ammonium compound, said composition being characterized by the fact that the structure of the inorganic gel therein is substantially that of the gel as originally formed.

12. A lubricating composition comprising a liquid oleaginous material, a hydrophilic inorganic gel in an amount to at least thicken said oleaginous material, and a minor amount, based on the weight of the gel, of a hydrophobic cationic surface-active agent, said agent being present in an amount to substantially improve the water resistance of said composition, said composition being characterized by the fact that the structure of the inorganic gel therein is substantially that of the gel as originally formed.

13. A lubricating composition comprising a liquid oleaginous material, a hydrophilic inorganic oxide gel in an amount to at least thicken said oleaginous material, and a minor amount, based on the weight of the gel, of a hydrophobic cationic surface-active agent, said agent being present in an amount to substantially improve the water resistance of said composition, said composition being characterized by the fact that the structure of the inorganic gel therein is substantially that of the gel as originally formed.

FRED H. STROSS.

REFERENCES CITED

The following references are of record in the file of this patent:

UNITED STATES PATENTS

| Number | Name | Date |
|---|---|---|
| 2,260,625 | Kistler | Oct. 28, 1941 |
| 2,265,962 | Bent et al. | Dec. 9, 1941 |
| 2,430,039 | Anderson | Nov. 4, 1947 |
| 2,452,602 | Robinson et al. | Nov. 2, 1948 |